2,967,787

FABRIC FINISHING WITH HEAT HARDENABLE RESIN

James A. Murphy, Wilmington, Del., assignor to Joseph Barcroft & Sons Company, Wilmington, Del., a corporation of Delaware No Drawing. Filed Aug. 21, 1958, Ser. No. 756,278

7 Claims. (Cl. 117—62)

This invention relates to an improved technique for imparting resin finishes to fabrics. More particularly the invention is concerned with the production of modified ketone aldehyde resins and the production of finished fabrics carrying such resins.

One embodiment of the invention may be illustrated by the following flow sheet:

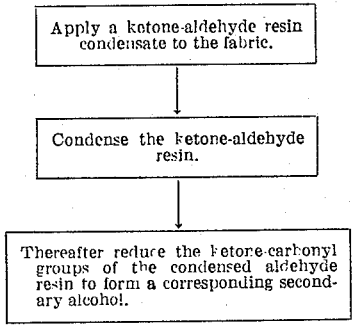

As used herein the term ketone-aldehyde resin means those resinous polymers formed by condensing a ketone and an aldehyde. There are a large number of such resinous materials ranging from the relatively simple methylol acetone resins prepared by reacting acetones with formaldehyde to the structurally more complex polymers obtained by condensing higher ketones with higher aldehydes.

All such ketone aldehyde polymers have a common structural characteristic namely, a carbonyl group positioned between two carbon atoms of the ketone used to form the resinous polymer. It is also quite common in the polymerized ketone-aldehyde resins to have an olefin conjugate to the carbonyl.

Due to the presence of the carbonyl group, these resins are highly reactive and if the polymers are subjected to ultraviolet light, the carbonyl group activates the molecule to the point where structural rearrangements occur which rapidly cause discoloration of the resin. Alkali also will activate the compound through the carbonyl groups to bring about structural rearrangements and hydrolysis which also discolors the resin.

The extreme sensitivity of the ketone-aldehyde resins to light and alkali has interfered with effective utilization of the resins in many applications for which they are otherwise ideally suited. For example, the ketone-aldehyde resins have long been recognized as having great possibilities as textile finishing agents in order to provide a non-chlorine retentive resin finish. However, as textiles and fabrics finished with these resins inevitably become exposed to ultraviolet rays in the course of use, the resins will become discolored. The alkali present in detergents and soaps used in commercial laundering of the fabrics also causes discoloration and hydrolysis of the resin. These drawbacks have prevented wide scale use of the ketone aldehyde resins as textile finishing agents, especially on white goods.

It is one of the objects of this invention to provide a modified form of the ketone-aldehyde resin which is not subject to discoloration when exposed to sunlight or when treated with alkali.

It is another object of this invention to provide a method of finishing fabrics with ketone-aldehyde resins so as to produce a fabric finish which will not be discolored even on prolonged exposure to sunlight or by laundering with alkaline soaps and detergents.

It is still another object of this invention to provide a new and novel type of resin finished fabric.

Other objectives and advantages of the invention will appear from the following discussion.

According to this invention, the objectives are achieved by treating the condensed ketone-aldehyde resin with a reducing agent capable of reacting with the carbonyl group of the condensed resin and thereby converting the ketone portions of the polymer to a corresponding secondary alcohol.

The techniques of this invention apply to the ketone aldehyde resins generally, but at the present time the most widely used resins are those prepared from the more inexpensive aldehydes and ketones—for example, the lower alkyl ketones such as acetone, methyl ethyl ketone, diethyl ketone, mesityl oxide, cyclohexanone, aryl ketones such as benzophenone, and the like, by reacting such compounds with aldehydes such as formaldehyde, acetaldehyde, glyoxal, acrolein, benzaldehyde, furfural and the like. The ketone aldehyde resins prepared from such materials have heretofore been used for many different purposes, for example, in the textile industry they have been used as fabric finishing agents; in the paint and varnish industry, they have been used in the production of coatings having electrical insulation properties and as substitutes for shellac; they have also been used as paper coatings and in the manufacture of synthetic glues and cements.

The manufacture of the various ketone aldehyde resins and the utilization of such resins involve well known techniques which will not be described in detail as the procedural aspects of my invention are concerned with a special after treatment which can be applied to articles which are coated with or impregnated with a cured or hardened ketone-aldehyde resin without consideration of the manner in which they were initially produced.

Since various aspects of my invention have been found to possess special utility in the field of fabric finishing the ensuing remarks will be primarily directed to describing my invention illustratively from the standpoint of the treatment of fabrics which have been finished with ketone aldehyde resins.

There are many patents and other publications which describe the use of thermosetting resins—including the ketone-aldehyde resins—as finishing agents for textiles. Essential steps in all such processes involve applying the heat hardenable resin to the fabric usually in the form of an aqueous solution and thereafter heating the treated fabric in the presence of a curing catalyst to harden and cure the resin. Various other operations are frequently carried out intermediate to the application and cure, for example, it is quite customary to dry the fabric before it is cured. Such treatments are intended to impart crease resistance and dimensionally stabilize the fabric. Other types of resin finish effects can be rendered durable or washfast by the resinating treatment. For example, if after impregnation with the resin solution, the fabric is dried and calendered before the resin is cured, the mechanical effect will be rendered durable. Heretofore, the ketone-aldehyde resins have been used for imparting both non-mechanical as well as mechanical effects to fabrics, but in all cases the resin finish was subject to discoloration as previously noted.

The ketone aldehyde resins which are most frequently used as a textile finishing agent are the precondensates prepared from ketones and aldehydes which, at the lower stages of condensation form precondensates, are water soluble or which can be readily dispersed in the medium used to apply the resin to the fabric. The acetone formaldehyde precondensates, hereinafter referred to as methylol acetones, have been found to be especially useful for these purposes as the raw materials are inexpensive and water soluble precondensates are prepared therefrom by reacting 1 mol of acetone with from about 1 to 8 mols of formaldehyde in the presence of alkaline catalysts. Such resins are usually applied to the fabric as aqueous solutions containing from about 5 to 50% resin solids and the amount of the precondensate deposited on the fabric can be adjusted as desired by varying the solution concentration or the solution pick-up. In most cases a pick-up of about 70% is employed.

Fabrics finished with ketone- aldehyde resins are stabilized, crease resistant, possess excellent non-chlorine retentiveness, but as previously mentioned the fabric will be readily discolored on exposure to sunlight or by subjecting it to laundering with alkaline materials. However, I have discovered that these objectionable features can be overcome if the cured resin is deactivated by reducing its carbonyl group to an alcohol or by forming a complex which can be hydrolyzed to convert the ketone portion of the resin to a corresponding secondary alcohol.

In accordance with this invention, various reducing agents can be used to deactivate the resin by converting carbonyl groups to alcohols. However, it is important that the reducing agent be one which will not cause degradation to the condensed ketone aldehyde resin and yet be sufficiently powerful to react with the carbonyl and form an alcohol or a complex which can be hydrolyzed to an alcohol.

Where ketone aldehyde resins are used as resinating agents in the finishing of cellulosic fabrics, certain additional matters must be considered in selecting the reducing agent to be employed—it must be one which will not degrade either the cellulose or the resin finish. It is also desirable to employ a reducing agent which can be readily carried by water and preferably a water soluble material. Water solubility is desirable because the resinous polymer to be reduced is usually formed both in and on the individual cellulose fibers which form the fabric yarn. If the reducing agent can be carried by water, the water will assist in swelling the cellulose fibers thereby enabling the reducing agent more readily to penetrate and react with the resin which is deposited inside the fibers themselves.

One class of reducing agents which is sufficiently powerful to effect reduction of the carbonyl group without degrading either the resin finish or the cellulose are the alkali metal borohydrides. In aqueous solution the alkali metal borohydride ionizes:

$$MBH_4 \rightarrow M^+ + BH_4^-$$

The reduction of the cured resin can be carried out in many ways which will depend somewhat on the form in which the cured polymer exists. Usually the reduction can be effected by applying the reducing agent to the resin coated or resin impregnated article either directly or dispersed in some carrying medium and allowing the reducing agent to remain in contact with the cured resin until the desired degree of reduction is effected.

The reducing agent is preferably employed in quantities which generally approximate the stoichiometric amount required for complete reduction of the carbonyl groups present in the condensed ketone-aldehyde polymer.

Where an alkali metal borohydride is employed as the reducing agent the stoichiometric quantity of borohydride necessary for the reaction to proceed to completion would require ¼ mol of borohydride for each mol of carbonyl groups present in the condensed ketone- aldehyde resin, and when an alkali metal borohydride is used in about this ratio the discoloration of fabrics finished with ketone-aldehyde type resins can be substantially eliminated even though 100% efficiency of the carbonyl reduction cannot be obtained. The ratio can also be varied over relatively wide limits (either up or down) and the treatment will still be effective to deactivate the cured ketone-aldehyde resin to a degree sufficient to permit the production of commercially satisfactory fabric resin finishes from the standpoint of resistance to discoloration on exposure to alkali or ultraviolet rays.

The rate of reduction will vary with type of reducing agent used and also with the time and temperature of contact. The alkali metal borohydrides are sufficiently powerful to deactivate the ketone-aldehyde resins within about 1 hour at room temperature or within about 3 minutes at a temperature of about 225° F. and longer times will not have any adverse effect. Where heating is employed to accelerate the reduction, severe conditions which would cause degradation should be avoided.

Reaction conditions which tend to detrimentally degrade the resin or the resin finish should of course be avoided.

The reduction of a ketone with borohydride is believed to take place in two steps, in the first step the borohydride ions react with the carbonyl group to form a boron complex or intermediate thus $$4R_2CO + BH_4^- \rightarrow B(OCHR_2)_4^-$$

and the boron resin intermediate will hydrolyze readily if water is present thus $$B(OCHR_2)_4^- + 4H_2O \rightarrow 4R_2CHOH + H_3BO_3 + OH^-$$

In the presence of certain polyhydroxy compounds the intermediate boron compounds are hard to hydrolyze, thus the boron-resin complex within cellulosic fibers can be very resistant to hydrolysis. However, it is not necessary to hydrolyze the boron-carbonyl complex during the treatment in order to obtain deactivation of ketone-aldehyde resin. Once the boron has combined with the carbonyl-carbon, deactivation is achieved. The boron may be removed from the fabric by a thorough after wash. The complex can also be left as such as the boron will be gradually removed during laundering operations which may occur on the end product made from the finished fabric.

If the boron-resin complex is left as such on the cellulosic, care must be taken to insure that materials which will cause scorching on subsequent ironing of the fabric have been removed. Therefore, we prefer to give the reduced fabric a thorough after wash.

It is usually desirable to incorporate a softener in the fabric to improve its sewability. This can be done either during the preliminary resination treatment or by incorporating the softener in the fiber at the time the reducing agent is introduced or even after the treatment has been completed.

Various of these improvements contemplated by the various aspects of the invention will be illustrated in somewhat greater detail in the examples given hereinafter.

*Example 1*

A 136/60 broadcloth fabric which had been treated with an alkaline cured ketone-aldehyde resin (15% resin precondensate solids being applied to the fabric) was padded through a 1% solution of potassium borohydride. The solution temperature was 20° C. and the solution pick-up was adjusted to approximately 70%. The wet fabric was then run into a steam chamber (saturated steam at 210–220° F.) and allowed to remain in contact with the steam for 10 minutes. The thus treated fabric was then rinsed in hot water and dried.

Example II

A poplin fabric which had been treated with an alkaline cured ketone-aldehyde resin precondensate was padded through a solution containing 0.5% potassium borohydride and as a softener 3% Carbowax 1500 (polymerized polyethylene oxide). The solution temperature was 25° C. and the solution pick up was adjusted to approximately 40%. The fabric was batched wet, allowed to remain in a batched condition for 2 hours and then dried.

Example III

A 96/56 pique fabric which had been treated with an alkaline cured ketone-aldehyde resin was padded through a 2% borohydride solution. The fabric pick-up was adjusted to 65%. The thus treated fabric was batched wet and permitted to stand for 5 hours at room temperature. The fabric was then washed in hot water and thereafter dried.

Example IV

A broad-cloth fabric which had been treated with a cured ketone-aldehyde resin was padded through a solution containing 5% potassium borohydride. The pick-up was adjusted to approximately 100%. The thus treated fabric was batched and allowed to stand for 6 hours. It was thereafter washed in hot water and dried.

Example V

A broadcloth fabric which had been finished with an acid cured ketone-aldehyde resin was padded through a solution containing 1% potassium borohydride, allowed to stand wet for 2 hours and thereafter washed in water and dried.

In each of the above examples, the resultant resin finish was no longer subject to alkali attack (discoloration and hydrolysis) and did not exhibit any appreciable discoloration when exposed to sunlight. The treated samples prepared according to Examples I-V showed substantially no discoloration on exposure to bright sunlight over a period of seven days, whereas control samples of the resin finished fabric which were not reduced were highly discolored when exposed to sunlight under identical conditions. Further, the wrinkle resistance and the non-chlorine retentive characteristics were not adversely affected by the reduction treatment.

I claim:

1. The method of finishing fabrics comprising applying a ketone-aldehyde resin precondensate to the fabric, condensing the ketone-aldehyde resin, and thereafter reducing the ketone-carbonyl groups of the completely condensed ketone-aldehyde resin to form a corresponding secondary alcohol.

2. The method according to claim 1 wherein the ketone-aldehyde resin precondensate is one prepared by reacting one mol of acetone with from 1 to 8 mols of formaldehyde.

3. The method according to claim 1 wherein the fabric is composed of cellulose and the reduction is effected by reacting the condensed resin with borohydride ions to form a boron complex with carbonyl carbon atoms of the condensed resin and thereafter hydrolyzing the boron complex to an alcohol.

4. Fabric finished with polymerized ketone-aldehyde resin characterized in that carbonyl groups of the polymerized ketone-aldehyde resin are reduced to corresponding secondary alcohols.

5. A modified ketone-aldehyde polymer characterized in that carbonyl groups of the ketone-aldehyde polymer are reduced to corresponding secondary alcohols.

6. A composition according to claim 5 wherein the ketone aldehyde polymer is a methylol acetone prepared by condensing 1 mol of acetone with from 1 to 8 mols of formaldehyde.

7. The secondary alcohols formed by reducing carbonyl groups of cured ketone-aldehyde resins.

References Cited in the file of this patent

UNITED STATES PATENTS

| | | |
|---|---|---|
| 2,504,835 | Hewett et al. | Apr. 18, 1950 |
| 2,683,721 | Schlesinger et al. | July 13, 1954 |